(12) United States Patent
Chu et al.

(10) Patent No.: US 10,856,228 B1
(45) Date of Patent: Dec. 1, 2020

(54) SYSTEMS AND METHODS FOR TRANSMITTING A WAKE-UP REQUEST FRAME TO LOWER POWER DEVICES IN A WIRELESS NETWORK

(71) Applicant: NXP USA, Inc., Austin, TX (US)

(72) Inventors: Liwen Chu, San Ramon, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 45 days.

(21) Appl. No.: 15/969,429

(22) Filed: May 2, 2018

Related U.S. Application Data (60) Provisional application No. 62/500,405, filed on May 2, 2017, provisional application No. 62/553,555, filed on Sep. 1, 2017, provisional application No. 62/620,950, filed on Jan. 23, 2018.

(51) Int. Cl.
*H04W 52/02* (2009.01)
*H04L 12/18* (2006.01)
*H04W 4/06* (2009.01)
*H04W 84/12* (2009.01)

(52) U.S. Cl.
CPC ....... *H04W 52/0235* (2013.01); *H04L 12/189* (2013.01); *H04W 4/06* (2013.01); *H04W 84/12* (2013.01)

(58) Field of Classification Search
CPC .. H04W 52/0235; H04W 84/12; H04L 12/189
See application file for complete search history.

(56) References Cited

U.S. PATENT DOCUMENTS

| | | | |
|---|---|---|---|
| 2016/0381638 A1* | 12/2016 | Min | H04W 52/0235 370/311 |
| 2017/0026907 A1* | 1/2017 | Min | H04W 52/0229 |
| 2017/0273024 A1* | 9/2017 | Xu | G06F 13/128 |
| 2018/0020501 A1* | 1/2018 | Aboul-Magd | H04W 52/0206 |
| 2018/0132176 A1* | 5/2018 | Abraham | H04L 43/087 |
| 2018/0184377 A1* | 6/2018 | Kenney | H04W 52/0235 |
| 2018/0242249 A1* | 8/2018 | Yang | H04W 52/028 |
| 2018/0295578 A1* | 10/2018 | Liu | H04W 52/0235 |
| 2018/0310247 A1* | 10/2018 | Chu | H04W 52/0235 |
| 2018/0359704 A1* | 12/2018 | Li | H04W 52/0219 |
| 2019/0253973 A1* | 8/2019 | Li | H04W 52/02 |
| 2019/0349857 A1* | 11/2019 | Kim | H04W 80/02 |

* cited by examiner

*Primary Examiner* — Steven H Nguyen (57) ABSTRACT

Embodiments described herein provide a method for transmitting a wake-up radio signal to low power devices in a wireless local area network. At a wireless access point, data for transmission to one or more lower power wireless devices is received. A wake-up radio packet is generated, including a wake-up data frame destined for the one or more lower power wireless devices. The wake-up data frame is configured with: a type field indicative of a type of the wake-up data frame, and a first identifier field indicative of information corresponding to the one or more lower power wireless devices. The wake-up radio packet is transmitted to the one or more lower power wireless devices to turn on wireless receivers at the one or more low power wireless devices prior to initiating data transmission with the one or more lower power wireless devices.

19 Claims, 6 Drawing Sheets

LP Wakeup Request

** SYSTEMS AND METHODS FOR TRANSMITTING A WAKE-UP REQUEST FRAME TO LOWER POWER DEVICES IN A WIRELESS NETWORK

CROSS-REFERENCE TO RELATED APPLICATION

This disclosure claims the benefit under 35 U.S.C. § 119(e) of U.S. Provisional Patent Application Nos. 62/500,405, filed on May 2, 2017, 62/553,555, filed on Sep. 1, 2017, and 62/620,950 filed on Jan. 23, 2018, which are all hereby incorporated by reference herein in their entirety.

FIELD OF USE

This disclosure relates to managing lower power (LP) devices in a wireless communication system, and specifically, to transmitting a wake-up request (WUR) frame to LP devices in a wireless communication system.

Background of the Disclosures

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing systems, a wireless local area network (WLAN) is usually used in an environment to interconnect a group of user devices, such as the Internet of Things (IoT) devices. For example, in a home environment, devices such as a thermostat, a laptop computer, a smart phone, a television set-top box, and/or the like, can be interconnected under the home WLAN. Such user devices are often LP Wi-Fi devices, which may transit into a sleep mode by turning off the Wi-Fi module to save power, when the device is not in use. To maintain the connection between an access point (AP) and a LP device of the WLAN, for example, the AP may need to transmit a WUR signal to "wake up" the LP device, e.g., a thermostat, such that the thermostat is notified and thus prepared to receive data packets of configuration data on the regular Wi-Fi from the AP. Existing systems sometimes use a beacon signal to transmit data to a LP device that is in a sleep mode. However, the LP device usually needs to wake up instantaneously to respond to the beacon signal, which requires the LP device to maintain a significant level of power even at a sleep mode and thus fails to provide a power efficient operation mode.

SUMMARY

Embodiments described herein provide a method for transmitting a wake-up radio signal to low power devices in a wireless local area network. At a wireless access point, data for transmission to one or more lower power wireless devices is received. A wake-up radio packet is generated, including a wake-up data frame destined for the one or more lower power wireless devices. The wake-up data frame is configured with: a type field indicative of a type of the wake-up data frame, and a first identifier field indicative of information corresponding to the one or more lower power wireless devices. The wake-up radio packet is transmitted to the one or more lower power wireless devices to turn on wireless receivers at the one or more low power wireless devices prior to initiating data transmission with the one or more lower power wireless devices.

In some implementations, the wake-up data frame is configured with a basic service set color field indicative of a basic service set color value, or a medium access control address field with a medium access control address corresponding to the wireless access point.

In some implementations, the information corresponding to the one or more lower power wireless devices includes a group identifier for a group of the one or more low power wireless devices. An association identifier that is unused by any wireless device associated with the wireless access point is allocated as a group identifier for the group of one or more low power wireless devices.

In some implementations, the wake-up data frame is configured with a second identifier field. The first identifier field contains a first association identifier corresponding to a first lower power wireless device from the one or more low power wireless devices, and the second identifier field contains a second association identifier corresponding to a second lower power wireless device from the one or more low power wireless devices.

In some implementations, the first identifier field contains a first identifier value as a starting identifier. The wake-up data frame is configured with a bitmap length field indicative of a length of an identifier bitmap, and a bitmap field containing the identifier bitmap. A respective value of each bit in the identifier bitmap indicates whether a low power wireless device corresponding to a respective identifier equivalent to the starting identifier plus an index of the respective bit belongs to a group of the one or more low power wireless devices.

In some implementations, the first identifier field contains a first identifier value as a starting identifier. The wake-up data frame is configured with a plurality of identifier increment fields subsequent to the first identifier field. Each of the plurality of identifier increment fields contains a respective increment value indicating that a low power wireless device corresponding to a respective identifier equivalent to the starting identifier plus the respective increment value belongs to a group of the one or more low power wireless devices.

In some implementations, the first identifier field contains a first identifier value as a starting identifier. The wake-up data frame is configured with a plurality of identifier increment fields subsequent to the first identifier field. Each of the plurality of identifier increment fields contains a respective increment value, and a low power wireless device corresponding to a respective identifier equivalent to an accumulative sum of the starting identifier and all increment values before and including the respective increment value belongs to a group of the one or more low power wireless devices.

In some implementations, the wake-up data frame is configured with a partial multicast medium access control address, or a short hash value of the multicast medium access control address. The multicast medium access control address corresponds to a group of the one or more low power wireless devices.

In some implementations, the wake-up data frame is configured with the type field to indicate the wake-up frame is a group type, and a cyclic redundancy check field subsequent to the type field indicative of a cyclic redundancy check value of the type field.

In some implementations, a plurality of wake-up data frames are transmitted sequentially. The plurality of wake-up data frames are separated by short interframe spaces, and each of the plurality of wake-up data frames is intended for one of the one or more low power wireless devices. Payload data is transmitted in a group frame to the one or more low power wireless devices subsequent to transmission of the plurality of wake-up data frames.

Embodiments described herein provide a network device for transmitting a wake-up radio signal to low power devices in a wireless local area network. The network device includes a buffer configured to receive data for transmission to one or more lower power wireless devices. The network device includes processing circuitry configured to generate a wake-up radio packet including a wake-up data frame destined for the one or more lower power wireless devices. The processing circuitry is further configured to configure the wake-up data frame with a type field indicative of a type of the wake-up data frame, and a first identifier field indicative of information corresponding to the one or more lower power wireless devices. The network device further includes a transceiver configured to transmit the wake-up radio packet to the one or more lower power wireless devices to turn on wireless receivers at the one or more low power wireless devices prior to initiating data transmission with the one or more lower power wireless devices.

Embodiments described herein provide a method for receiving a wake-up radio signal to low power devices in a wireless local area network. When a primary wireless transceiver of a lower power wireless device is inactive, a wake-up radio packet including a wake-up data frame is received, at a secondary lower power wireless receiver of the lower power wireless device, from a wireless access point. A type of the wake-up data frame is determined from a type field in the wake-up data frame. Whether the wake-up radio packet is intended for the lower power wireless device based on information corresponding to one or more intended lower power wireless devices from an identifier field in the wake-up data frame is then determined. In response to determining that the wake-up radio packet is intended for the lower power wireless device, the primary wireless receiver is activated for data transmission from the wireless access point.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for transmitting a wake-up request (WUR) frame to LP devices in a wireless communication system, and specifically, an 802.11ax WLAN.

In a WLAN environment, an LP device may constantly turn off its Wi-Fi module to save power when the LP device is not in use. To maintain the connection between the AP and the LP device, duty-cycle protocols are sometimes defined to synchronize the AP and the LP device, so that the AP is configured to wake up the LP device at each duty-cycled operation. However, with duty-cycled operations, low power consumption and low latency can sometimes be conflicting qualities. For example, to increase batter life, the LP device attempts to sleep more, which may increase latency when the LP device needs to be awaken back to an operational mode. On the other hand, the receive data with low latency, the LP device may need to constantly "wake up," which reduces the battery life. A LP wake-up receiver is used as a companion radio receiver with an 802.11 WLAN receiver, which is used to serve as a WUR signal receiver, while the 802.aa WLAN receiver is used to receive payload user data after the WUR signal is received. Embodiments described herein provide various formats for a WUR frame to be received and processed by the LP wake-up receiver.

Specifically, the wireless AP may send a WUR frame to wake up more than one LP device, e.g., by broadcasting a group WUR frame to wake up a group of LP devices. The wireless AP may configure the WUR frame to include identifying information in various formats, as described in the following figures, to identify LP devices of the intended group. For each LP device that receives the WUR frame via its respective LP wake-up receiver, the LP wake-up receiver may parse the WUR frame to extract the identifying information according to the configured format, and then decide whether the WUR frame is intended for the respective LP device, i.e., whether the respective LP device is a group member of the intended group corresponding to the group WUR frame.

Figure 1:
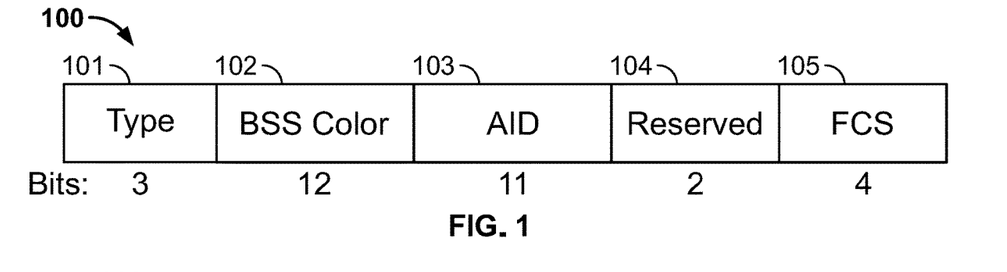
FIG. 1 is a block diagram illustrating an example WUR data frame defined by the basic service sets (BSS) coloring, according to some embodiments described herein.

FIG. 1 is a block diagram 100 illustrating an example WUR data frame defined by the basic service sets (BSS) coloring, according to some embodiments described herein. In 802.11 WLANs, a service set is defined as a group of wireless network devices that are operating with the same networking parameters. The service sets are arranged hierarchically, basic service sets (BSS) are defined as units of devices operating with the same medium access characteristics (i.e. radio frequency, modulation scheme etc.). To increase capacity in a dense environment (e.g., a large number of user devices), frequency reuse between BSS's is usually increased. However, devices from one BSS can often defer to another BSS that share the same channel with the first BSS, with no increase in network capacity. Thus, 802.11ax adopts a method known as BSS coloring for addressing medium contention overhead due to the overlapping basic service set (OBSS) and spatial reuse. 802.11ax radios can differentiate between BSS's by adding a number (e.g., the "color") to the PHY header of each packet to identify a respective BSS associated with a device. New channel access behavior can then be assigned based on the color detected from the PHY header of the packet.

Similarly, the WUR frame can be designed based on BSS color, e.g., the respective BSS that the intended LP device belongs to. As shown at diagram 100, the example WUR frame may include a three-bit type filed 101 specifying the type of the frame (e.g., a WUR frame), a 12-bit BSS color 102 that indicates the BSS the intended LP device belongs to, a 11-bit association identifier (AID) 103 that identifies the intended LP device, a two-bit reserved field 104, and a four-bit frame check sequence (FCS) field 105. When an access point (AP) sends the WUR frame 100 to an intended LP device, the AP may configure the AP's identifier in the BSS color field 102, which is long enough to avoid color collision. The 12-bit BSS color field 102 may be different from the BSS color used in a payload data frame under 802.11ax, since the 802.11ax BSS color field is shorter than 12 bits. The four-bit (or greater than four bit) FCS field 105 can be used as cyclic redundancy check to detect the transmission error. In some embodiments, When the WUR frame 100 is used as a unicast WUR frame, partial AID may replace the AID field 103, and be used as an identifier for the intended LP device. For unicast WUR frames, the identifier for an intended LP device can be an identifier which is solely used for LP device in the network, i.e., allocated from the range between [1, maximum ID number], where the maximum ID number may be any of 255, 511, 1023, 2047 or other value in the form of $2^n-1$. In some implementations, the AP may announce the maximum ID value. Then the unicast WUR frame length may change based on the maximum ID value accordingly. For example, when the maximum ID value is $2^N-1$, the length of the (partial) AID field that represents the identifier for the intended LP device in a unicast WUR frame is equivalent to N, which affects the total length of the WUR frame as well.

Figure 2:
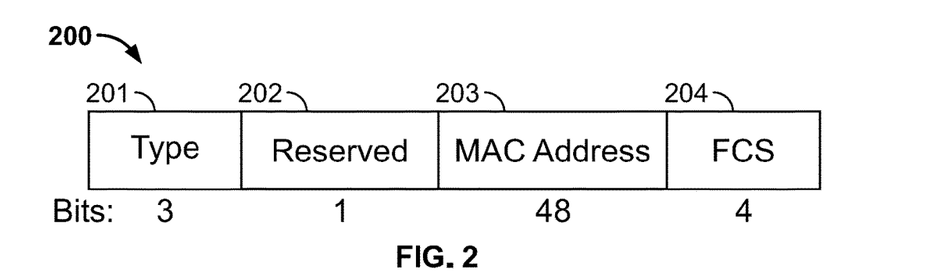
FIG. 2 is a block diagram illustrating an example WUR data frame defined by the medium access control (MAC) address, according to some embodiments described herein.

FIG. 2 is a block diagram 200 illustrating an example WUR data frame defined by the medium access control (MAC) address, according to some embodiments described herein. As shown at diagram 200, the WUR frame includes a three-bit type field 201 (which can be similar to the type field 101 in FIG. 1), one reserved bit 202, a 48-bit MAC address field 203, and a f-bit FCS field 204 (which can be similar to the FCS field 105 in FIG. 1). When the AP configures the WUR frame, the MAC address field 203 is configured with the intended LP device's MAC address when the WUR frame 200 is a unicast frame. Alternatively, the AP may configure the MAC address field 203 as the MAC address of the AP when the WUR frame is a group-address frame, e.g., when the AP intends to use the WUR frame to wake up a group of LP devices. When the MAC address field 203 in the WUR frame is configured as the MAC address of the AP, another AID field is usually needed to indicate the unicast, broadcast, multicast receivers, e.g., see frame 400 in FIG. 4, frame 502 in FIG. 5, and frame 602 in FIG. 6.

In some embodiments, when the management information to be transmitted to the intended LP device(s) only requires a small number of bits, the management information can be embedded into the WUR frame. In this way, no following management frame transmission is needed, which reduces transmission power and saves bandwidth. For example, as an additional management frame usually comprises a PHY preamble, a signal portion of one OFDM symbol, and the payload data (usually including a variable number of OFDM symbols), the additional management frame transmission time can include the short interface space (SIFS)+$T_{preamble}$+$T_{SIG}$+$T_{MFDU}$=16+16+4+$T_{MFDU}$. If one bit can be transmitted within Ops (e.g., one OFDMA symbol transmission time), when the required transmission time of the management frame is less than 64 μs, the management information may be moved to be embedded into the WUR frame. For example, management information for a channel switch includes the switch mode, the new operating class (8 bits), a new channel number (8 bits), a switch count (8 bits). Another example is the timing synchronization function (TSF) time broadcast information, which is usually 24-bit TSF time. In some implementations, when the WUR frame is transmitted at a higher data rate, more management/control information can be added to the WUR frame.

In some embodiments, the management frame can be transmitted with updated BSS operation information. When beacon frames and management frames for unassociated devices are transmitted without announced by a WUR frame, e.g., without the WUR frames to "wake up" the unassociated devices, a broadcast WUR frame can be used to announce the management frames, which may carry updated BSS operation parameters, e.g. enhanced distributed channel access (EDCA) parameters, operation channels etc. When the WUR frame announces both normal management frames and management frames which carry the updated BSS operation parameters, the WUR frame may be configured with different types as reflected in the type field (e.g., 101 in FIG. 1 or 201 in FIG. 2) to identify the respective type of the WUR frame. Thus, if a LP device receives a broadcast WUR frame and determines that the WUR frame announces a management frame for updating BSS operating parameters, e.g., by reading the type field of the WUR type, the LP device may "wake up" to receive the management frame that is subsequently transmitted to the LP device.

In some embodiments, an AP may transmit a management frame multiple times to guarantee the receipt of the BSS operation parameters at the intended LP device. In order for a LP device to receive the same management frames multiple times, a Dialog Token, e.g. a four-bit field can be added to the WUR frame. For example, the value of the Dialog Token field may start from 0, and each time the BSS operation parameters change, the Dialog Token is incremented by 1. If the value of the Dialog Token reaches 16 (the maximum value that can be achieved by four bits), the Dialog Token changes to 0.

In some embodiments, each time when a LP device receives a WUR frame that announces the management frames carrying the updated BSS operation parameters and when the LP device correctly receives the management frame subsequent to the WUR frame, the LP device records the value of the Dialog Token. If the LP device receives a WUR frame that has the same Dialog Token value as the record, the LP device may ignore the WUR frame, because the same Dialog Token value indicates that the BSS operation parameters remain unchanged compared to the last management frame received. If the LP device receives a WUR frame having a Dialog Token value different from the recorded token value at the LP device, the LP device may receive the subsequent management frame for updated BSS operation parameters.

Figure 3:
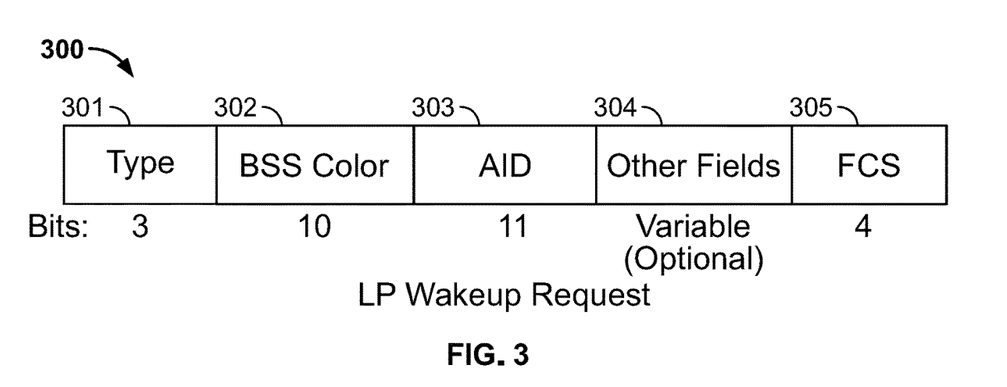
FIG. 3 is a block diagram illustrating an example WUR data frame intended for a group of LP devices, defined by the BSS color, according to some embodiments described herein.

FIG. 3 is a block diagram 300 illustrating an example WUR data frame intended for a group of LP devices, defined by the BSS color, according to some embodiments described herein. As shown at diagram 300, the WUR frame includes a three-bit type field 301, a 10-bit BSS color field 302, an 11-bit AID field 303, a variable number of bits for other fields 304 and a four-bit FCS field 305. For example, an AP can allocate AIDs that are not used by associated LP devices as a group ID for a group of LP devices, e.g., the AID field 303 can be used for the group ID. Each group ID corresponds to multiple LP devices as group members. In some implementations, if higher data rate can be used for transmitting the WUR frame, one option is that the AID field 303 can be configured as the multicast address. In some implementations, the type field 301 may be configured to indicate the WUR frame is a group wakeup frame.

In some embodiments, the negotiation of static group may be allocated per individual target wake time (TWT) establishment. The LP devices have the same TWT service period (SP) may be allocated into the same static group. The group ID that is to be configured with the AID field 303, may be the partial timing synchronization function (TSF) time of the TWT start time, which may be a logical group ID value from the range of [0, maximum group value], where the maximum group value may take a form of $2^n-1$, e.g., 63, 127, 255, 511, etc. Thus, each LP device in the group may have a group member ID, e.g. within [0, maximum group value]. The group member ID can be used to identify specific members in the group to wake up. For example, the other fields 304 in the WUR frame 300 may be used as a group member bitmap field to identify specific LP devices in the group to be waken up, which may be similar to 607 in FIG. 6.

Figure 4:
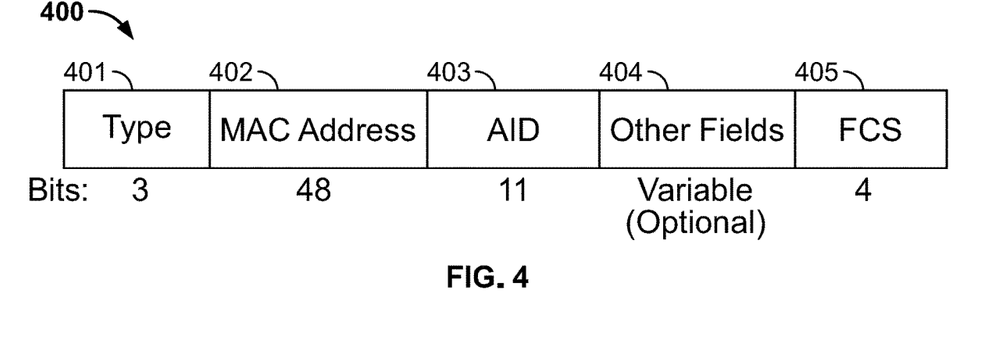
FIG. 4 is a block diagram 400 illustrating an example WUR data frame intended for a group of LP devices, defined by the MAC address, according to some embodiments described herein.

FIG. 4 is a block diagram 400 illustrating an example WUR data frame intended for a group of LP devices, defined by the MAC address, according to some embodiments described herein. As shown at diagram 400, the WUR frame includes a three-bit type field 401, a 48-bit MAC address field 402, an 11-bit AID field 403, a variable number of bits for other fields 404 and a four-bit FCS field 405. For example, the type field 401 is configured to indicate the WUR frame is a group wakeup frame, which may include an optional group ID or multicast MAC address in the WUR frame. The MAC address field 402 is configured with the MAC address of the AP.

In some embodiments, a group ID is assigned to a group of LP devices that are statically allocated or indicated as members of the group. In some implementations, the AP may announce the group members of a group by configuring AIDs of members of the group in the WUR frame, and broadcast the WUR frame to the LP devices such that each LP device may determine whether it is an intended group member by examining the AIDs in the WUR frame, as further described in relation to FIG. 5. In this case, if higher data rate can be used for transmitting the WUR frame, the AID field (303 in FIG. 3 or 403 in FIG. 4) can be replaced by a multicast address.

In some implementations, the AP may announce groups of LP devices, e.g. the multicast MAC address that the AP transmits the WUR to defines one group and each LP device decides which group to join. For example, when an LP device receives a broadcast group WUR request having the multicast MAC address, the LP device may determine whether the multicast MAC address is intended for the respective LP device, and then the LP device may join the group.

In some implementations, the LP device may request a scheduled start time for transmission, an interval between two scheduled transmissions, and the AP may accordingly group the LP devices based on the requested schedules of transmissions. For example, if LP devices A, B and C are intended receivers for the first transmission, while LP devices D, E and F are intended receivers for the second transmission, the AP may group devices A, B and C as members of the same group, and devices D, E and F as members of a different group.

Figure 5:
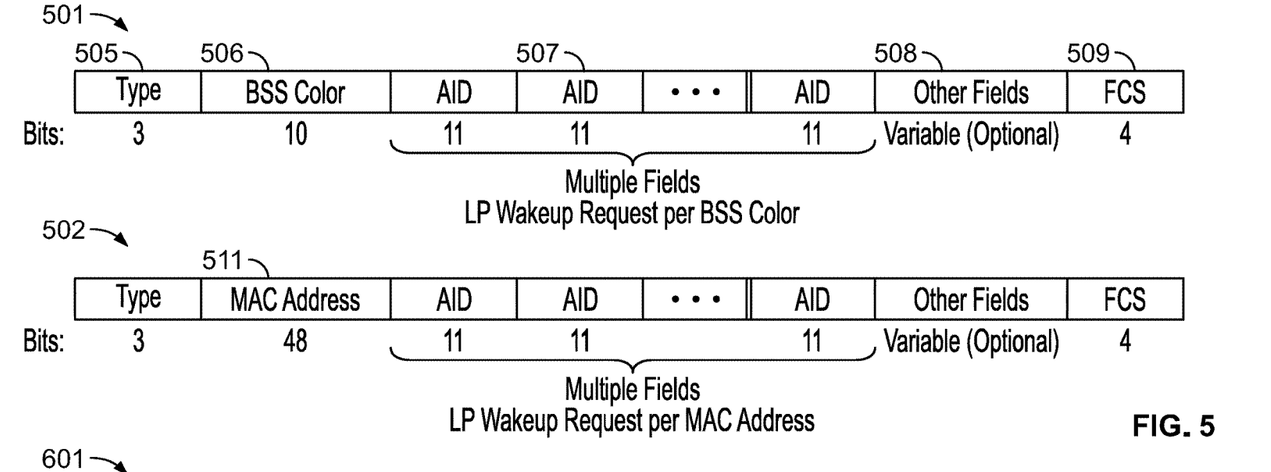
FIG. 5 shows an example block diagram illustrating transmitting WUR frames configured for group wakeup support with AIDs configured by the AP, according to embodiments described herein.

FIG. 5 shows an example block diagram illustrating transmitting WUR frames configured for group wakeup support with AIDs configured by the AP, according to embodiments described herein. Data frame 501 shows a group WUR frame defined by the BSS color, comprising a 3-bit type filed 505 (indicating the WUR frame is a group frame), a 10-bit BSS color field 506, multiple 11-bit AID fields 507, other fields 508 and a four-bit FCS field 509. Similarly, the data frame 502 shows a group WUR frame defined by the MAC address, having similar fields as those in the frame 501, except that the BSS color field 506 is replaced with a 48-bit MAC address field 511, which may be configured with the MAC address of the AP. In both frames 501 and 502, multiple AID fields 507 are used to indicate AIDs of LP devices that are members of the intended group for the WUR frame. By configuring the AIDs in the WUR frame, the AP can decide which LP devices are the group members just before the transmission of the WUR frame. In some implementations, one or more of the AID fields 507 can have less bits, e.g. nine bits, ten bits, etc. In some implementations, a field may be inserted between the BSS color field 506 and the first AID field, which can be used to indicate the number of AID fields 507 included in the frame 501.

In some embodiments, for WUR frames shown at 501 and 502, all the WUR frames may have same length. Thus, no WUR frame length indication in the WUR PHY header is needed.

Figure 6:
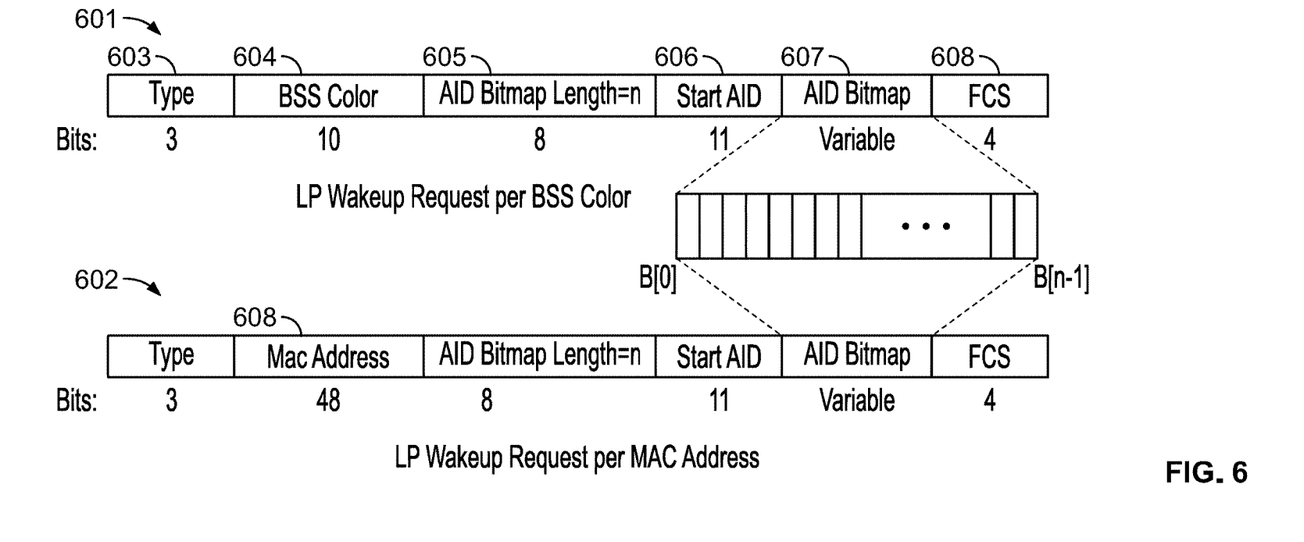
FIG. 6 shows an example block diagram illustrating transmitting WUR frames configured for group wakeup support with a bitmap to identify AIDs of LP devices in a group, according to embodiments described herein.

FIG. 6 shows an example block diagram illustrating transmitting WUR frames configured for group wakeup support with a bitmap to identify AIDs of LP devices in a group, according to embodiments described herein. Data frame 601 shows a group WUR frame defined by the BSS color, comprising a 3-bit type filed 603 (indicating the WUR frame is a group frame), a 10-bit BSS color field 604, an 8-bit AID bitmap length field 605, an 11-bit start AID field 606, an AID bitmap 607 that includes a variable number of bits, and a four-bit FCS field 509. Similarly, the data frame 602 shows a group WUR frame defined by the MAC address, having similar fields as those in the frame 601, except that the BSS color field 604 is replaced with a 48-bit MAC address field 609, which may be configured with the MAC address of the AP. Specifically, the optional AID bitmap length field 605 indicates the bitmap length of AID Bitmap field 607. The start AID field 606 indicates the corresponding AID of the first bit (B[0]) of the AID Bitmap field 607. In the AID bitmap field 607, for the x-th bit B[x], if B[x] is not 0, then the LP device with an AID=start AID+x is the group member. Otherwise the LP device with an AID=start AID+x is not the group member. For example, when the start AID is "001 001 001 10," and B[1]=0, and B[2]=1: the LP device with the AID=001 001 001 10+1=001 001 001 11 is not a group member, but the LP device with the AID=001 001 001 10+2=001 001 010 00 is a group member. By configuring the AID bitmap field 607, the AP can decide, among a spectrum of consecutive AIDs, which LP devices are the group members, just before the transmission of the WUR frame.

In some embodiments, the WUR frame 601 04 602 may have a pre-defined length. One or two bits in the WUR PHY header are used to indicate the predefined length.

Figure 7:
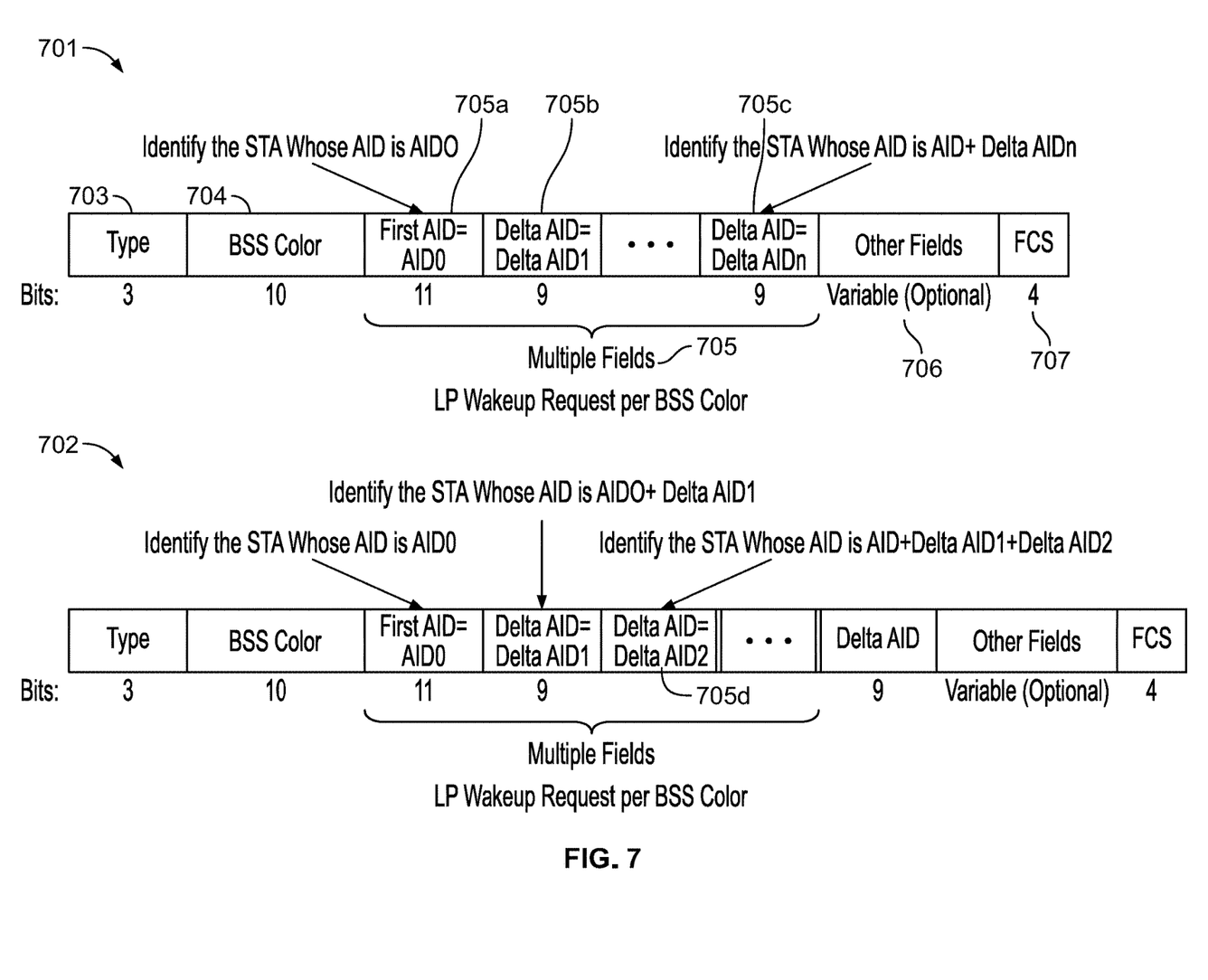
FIG. 7 shows an example block diagram illustrating transmitting WUR frames configured for group wakeup support with alternative field configurations to identify AIDS of LP devices that belong to a group, according to embodiments described herein.

FIG. 7 shows an example block diagram illustrating transmitting WUR frames configured for group wakeup support with alternative field configurations to identify AIDS of LP devices that belong to a group, according to embodiments described herein. Data frame 701 shows a group WUR frame defined by the BSS color, comprising a 3-bit type filed 703 (indicating the WUR frame is a group frame), a 10-bit BSS color field 704, various bits for AID identification 705, other fields 706 and a four-bit FCS field 707. Specifically, the first AID field 705*a* within the multiple fields 705 indicates an 11-bit AID0, which may be the lowest or the highest value, or a value other than lowest and highest values in AIDs of LP devices that belong to the group. For example, when AID0 represents the lowest value in the group of LP devise, the delta AID field with delta AIDi corresponds to an LP device having an AID equal to AID0+delta AIDi, see 705*b* or 705*c*. Or alternatively, as shown in data frame 702, the delta AID field 705*d* with delta AIDi corresponds to an LP device having an AID equal to AID0+delta AID1+ . . . +AID(i−1). In some implementations, an additional field indicative of the number of AID fields may be added before the first AID field 705*a*. In some implementations, a delta AID length field may be added before the first AID field 705*a*, which indicates delta AID length, i.e., the number of delta AID fields following the first AID field 705*a*. In some implementations, the delta AID Length can also be specified in a beacon frame.

In some embodiments, the length of the WUR frames 701 or 702 may be flexible. For example, a value x, which is placed within the WUR frame, is used to indicates the length of the WUR frame in bits. Or the value x is used to indicate the difference between the actual length of a respective WUR frame in bits and the minimum length of the WUR frame in bits. For another example, the value x is used to indicate the length of a WUR frame in four bits, e.g., the actual length of the WUR frame in bits divided by 4. Or, the value x is used to indicate the difference between the length of the WUR frame in four bits and the length of the shortest WUR frame in four bits.

Figure 8:
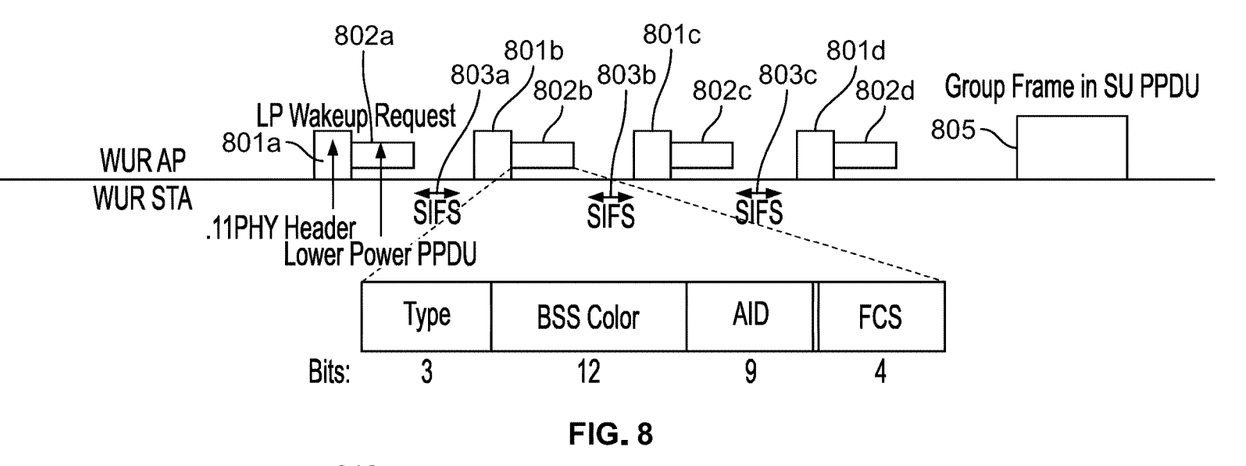
FIGS. 8-9 show example block diagrams illustrating transmitting multiple group WUR frames with SIFS interframe spaces, according to embodiments described herein.

FIGS. 8-9 show example block diagrams illustrating transmitting multiple group WUR frames with SIFS inter-frame spaces, according to embodiments described herein. As shown in FIG. 8, multiple WUR frames 802*a*-*d* can be transmitted sequentially, each following a respective 802.11 PHY header 801*a*-*d*, separated by SIFS inter-frame spaces 803*a*-*c* to wake up multiple LP devices. Specifically, each WUR frame 802*a*-*d* may be used to wake up a specific LP device, and may have a structure similar to frame 100 in FIG. 1, with an AID corresponding to the intended LP device. Following the series of WUR frames 802*a*-*d*, the payload frame 805 may be transmitted as single user (SU) PLCP Protocol Data Units (PPDUs) intended for each respective LP device that has been waken up.

Figure 9:
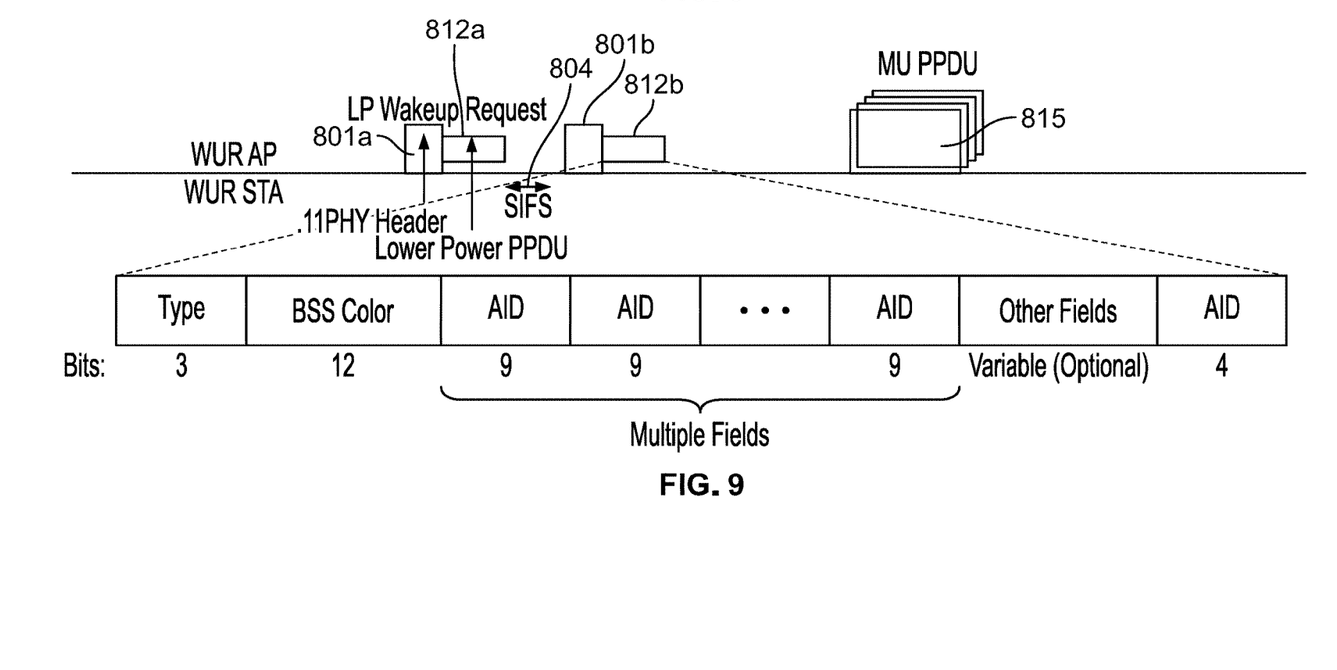

In another embodiment, as shown in FIG. 9, group WUR frames 812*a*-*b* may be transmitted sequentially, each following a respective 802.11 PHY header 801*a*-*b*, separated by SIFS inter-frame space 804. Specifically, each WUR frame 812*a*-*b* may be used to wake up a group of LP devices, and may have a structure similar to frame 300 in FIG. 3, each configured with a number of AIDs corresponding to the LP devices that belong to the intended group. Following the series of group WUR frames 812*a*-*b*, the payload frames 815 may be transmitted as multi-user (MU) PPDUs, each intended for the group of LP devices that have been waken up.

Figure 10:
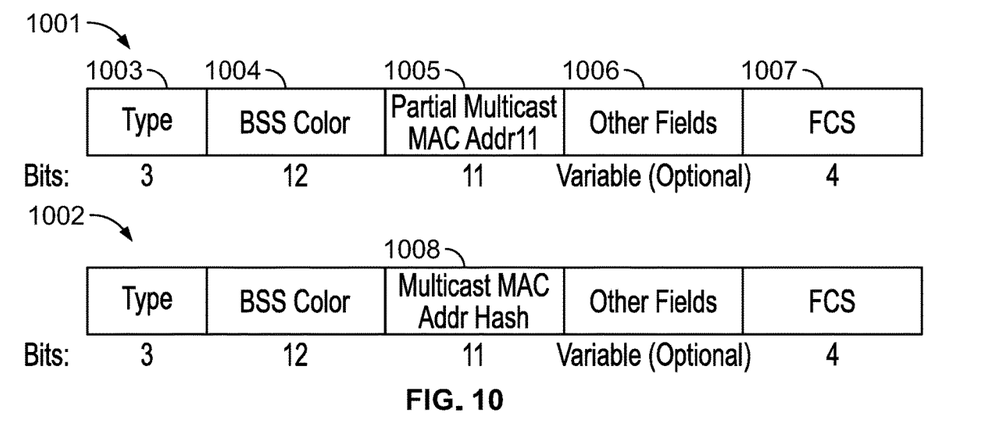
FIG. 10 shows an example block diagram illustrating alternative configurations of a group WUR frame using multicast MAC addresses, according to embodiments described herein.

FIG. 10 shows an example block diagram illustrating alternative configurations of a group WUR frame using multicast MAC addresses, according to embodiments described herein. The WUR frame 1001 includes a three-bit type field 1003 (indicating the WUR frame is a group frame), a 12-bit BSS color field 1004, an 11-bit partial multicast MAC address field 1005, other fields 1106 and a four-bit FCS field 1007. Specifically, the partial multicast MAC address may include 11 bits from the multicast MAC address, which is used to identify the group of LP devices. In some implementation, an optional cyclic redundant check (CRC) field may be inserted after the type field 1003 to protect the type field 1003. In another embodiment, as shown in WUR frame 1002, the short hash value of the multicast MAC address 1008, e.g. an 11-bit hash value of multicast MAC address, may be used to identify the group of LP devices, in place of the partial multicast MAC address 1006.

As shown at WUR frames 1001 and 1002, unlike the frame structures discussed in relation to FIGS. 1-9, the WUR frames 1001 and 1002 do not have an AID field. This is because if multiple BSS ID support is not necessary, the broadcast group WUR frame does not need an AID field. Or if multiple BSS ID support is required and each virtual AP has its unique BSS color, the broadcast group WUR frame does not need an AID field. However, if multiple BSS ID support is required and all virtual APs have one BSS color, then an AID field is needed to identify the LP devices to be waken up. The AID, e.g. an AID corresponding to a virtual AP for the intended group of LP devices, may identify the virtual AP and accordingly the LP devices associated with the virtual AP (of the group) to wake up. For example, when the AID is configured to be all 1, the AID identifies all virtual APs and accordingly the LP devices associated with all virtual APs to wake up.

In some embodiments, each type of the WUR frame 1001 or 1002 has a unique length, and the type field indicates the type of the WUR frame. Thus, a length field for the WUR frame is not needed in the PHY header, as the length can be already indicated by the type value in the type field.

Figure 11:
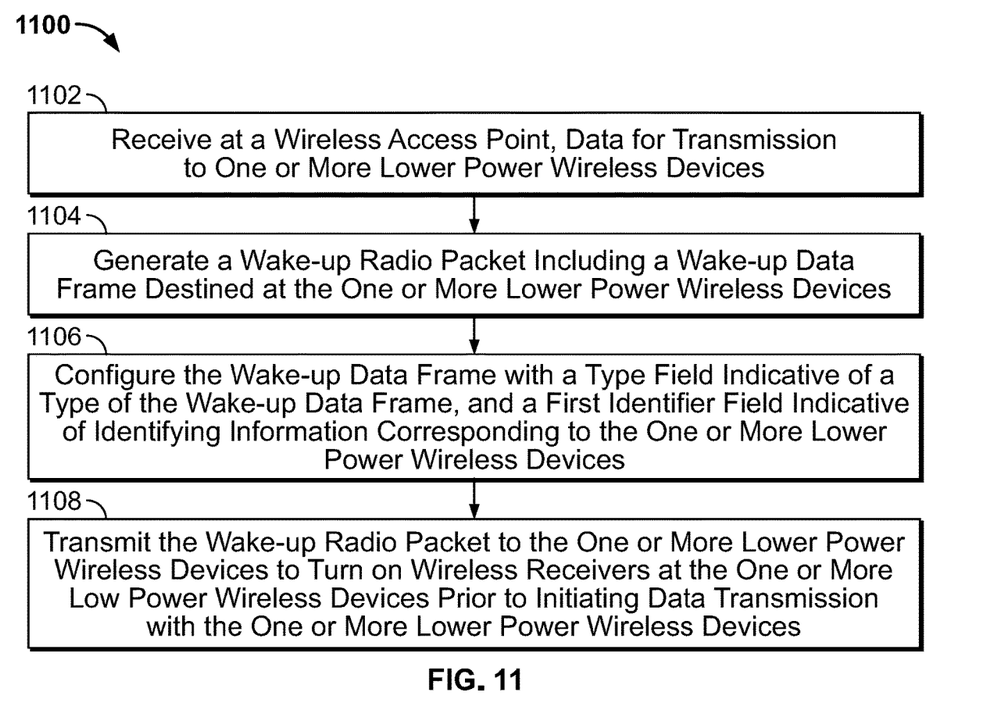
FIG. 11 shows an example logic diagram illustrating a wireless access point configuring and transmitting a WUR frame (similar to those described in FIGS. 1-10) to wake up one or more LP devices prior to transmitting payload data, according to embodiments described herein.

FIG. 11 shows an example logic diagram 1100 illustrating a wireless access point configuring and transmitting a WUR frame (similar to those described in FIGS. 1-10) to wake up one or more LP devices prior to transmitting payload data, according to embodiments described herein. At 1102, a buffer at a wireless AP may receive data for transmission to one or more LP devices that are associated with the AP. For example, each LP device may be allocated with an AID associated with the AP. At 1104, processing circuitry at the AP may generate a wake-up radio packet to "wake up" the intended LP devices prior to transmitting any payload data to the LP devices. The wake-up radio packet may include a wake-up data frame destined at the one or more lower power wireless devices. For example, the wake-up data frame may configure the wake-up data frame in a similar form as described in any of FIGS. 1-10. For instance, the wake-up data frame may have a type field (e.g., see 301 in FIG. 3, 401 in FIG. 4, etc.) indicative of a type of the wake-up data frame, and a first identifier field (e.g., see 303 in FIG. 3, 403 in FIG. 4, etc.) indicative of identifying information corresponding to the one or more lower power wireless devices. At 1106, a transceiver at the AP may transmit the wake-up radio packet to the one or more LP devices to turn on wireless receivers at the one or more LP devices prior to initiating data transmission with the one or more LP devices.

Figure 12:
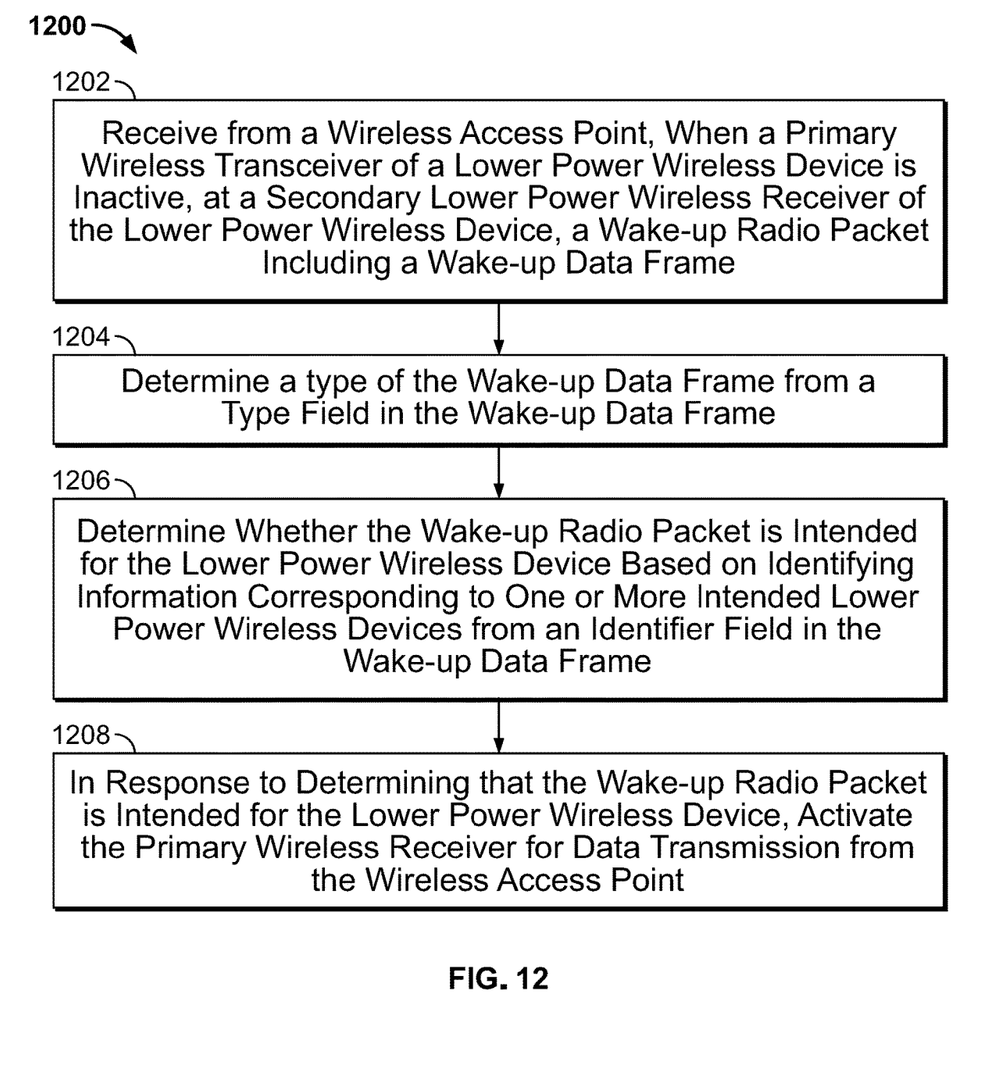
FIG. 12 shows an example logic diagram illustrating a LP wireless device receiving and processing a WUR frame (similar to those described in FIGS. 1-10) prior to receiving any payload data, according to embodiments described herein.

FIG. 12 shows an example logic diagram 1200 illustrating a LP wireless device receiving and processing a WUR frame (similar to those described in FIGS. 1-10) prior to receiving any payload data, according to embodiments described herein. The LP wireless device may contain a primary wireless transceiver that is configured to transmit and receive 802.11 data packets with the AP, and a secondary low power wireless receiver that is configured to receive WUR frames. When the LP wireless device is at sleep mode, the primary 802.11 transceiver is turned off to save power, but the lower power wireless receiver is available to monitor any WUR data frame from the AP.

At 1202, the low power wireless receiver at the LP device may receive, from the wireless AP, when the primary wireless transceiver of the LP device is inactive, at the secondary lower power wireless receiver of the lower power wireless device, a wake-up radio packet including a WUR frame. At 1204, the low power wireless receiver may determine a type of the wake-up data frame from a type field (e.g., see 303 in FIG. 3, 403 in FIG. 4, etc.) in the wake-up data frame. For example, the type field may indicate the WUR frame is intended for a group of LP devices. At 1206, the low power wireless receiver may determine whether the wake-up radio packet is intended for the lower power wireless device based on identifying information corresponding to one or more intended lower power wireless devices from an identifier field in the wake-up data frame. For example, the lower power wireless receiver may determine whether an AID corresponding to the LP device or a group ID corresponding to a group that the LP device belongs to is indicated by the identifying information. At 1208, in response to determining that the wake-up radio packet is intended for the LP device, the LP device may activate the primary wireless receiver for data transmission from the wireless AP. For example, the low power wireless receiver may send a signal to turn on the primary 802.11 transceiver at the LP device.

Various embodiments discussed in conjunction with FIGS. 1-12 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless AP, LP devices discussed in relation to FIGS. 1-12), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for transmitting a wake-up radio signal to low power devices in a wireless local area network, the method comprising:

receiving, at a wireless access point, data for transmission to one or more lower power wireless devices;

generating a wake-up radio packet including a wake-up data frame destined for the one or more lower power wireless devices;

configuring the wake-up data frame with:
 a type field indicative of a type of the wake-up data frame, wherein the type field also indicates a length of the wake-up data frame; and
 a first identifier field indicative of information corresponding to the one or more lower power wireless devices;

transmitting the wake-up radio packet and a plurality of other wake-up radio packets to the one or more lower power wireless devices to turn on wireless receivers at the one or more lower power wireless devices prior to initiating data transmission with the one or more lower power wireless devices;

transmitting a plurality of wake-up data frames sequentially wherein the plurality of wake-up data frames are separated by short interframe spaces, and wherein each of the plurality of wake-up data frames is intended for one of the one or more lower power wireless devices; and transmitting payload data in a group frame to the one or more lower power wireless devices subsequent to transmission of the plurality of wake-up data frames.

2. The method of claim 1, further comprising:
configuring the wake-up data frame with a basic service set color field indicative of a basic service set color value, or a medium access control address field with a medium access control address corresponding to the wireless access point.

3. The method of claim 1, wherein the information corresponding to the one or more lower power wireless devices includes a group identifier for a group of the one or more low power wireless devices, and further comprising:
allocating an association identifier that is unused by any wireless device associated with the wireless access point as a group identifier for the group of one or more lower power wireless devices.

4. The method of claim 1, further comprising:
configuring the wake-up data frame with a second identifier field,
wherein the first identifier field contains a first association identifier corresponding to a first lower power wireless device from the one or more lower power wireless devices, and the second identifier field contains a second association identifier corresponding to a second lower power wireless device from the one or more lower power wireless devices.

5. The method of claim 1, wherein the first identifier field contains a first identifier value as a starting identifier, and further comprising:
configuring the wake-up data frame with:
a bitmap length field indicative of a length of an identifier bitmap; and
a bitmap field containing the identifier bitmap, wherein a respective value of each bit in the identifier bitmap indicates whether a lower power wireless device corresponding to a respective identifier equivalent to the starting identifier plus an index of the respective bit belongs to a group of the one or more lower power wireless devices.

6. The method of claim 1, wherein the first identifier field contains a first identifier value as a starting identifier, and further comprising:
configuring the wake-up data frame with:
a plurality of identifier increment fields subsequent to the first identifier field,
wherein each of the plurality of identifier increment fields contains a respective increment value indicating that a lower power wireless device corresponding to a respective identifier equivalent to the starting identifier plus the respective increment value belongs to a group of the one or more lower power wireless devices.

7. The method of claim 1, wherein the first identifier field contains a first identifier value as a starting identifier, and further comprising:
configuring the wake-up data frame with:
a plurality of identifier increment fields subsequent to the first identifier field,
wherein each of the plurality of identifier increment fields contains a respective increment value, and
wherein a lower power wireless device corresponding to a respective identifier equivalent to an accumulative sum of the starting identifier and all increment values before and including the respective increment value belongs to a group of the one or more lower power wireless devices.

8. The method of claim 1, further comprising:
configuring the wake-up data frame with:
a partial multicast medium access control address, or a short hash value of the multicast medium access control address,
wherein the multicast medium access control address corresponds to a group of the one or more lower power wireless devices.

9. The method of claim 8, further comprising:
configuring the wake-up data frame with:
the type field to indicate the wake-up frame is a group type; and
a cyclic redundancy check field subsequent to the type field indicative of a cyclic redundancy check value of the type field.

10. A network device for transmitting a wake-up radio signal to low power devices in a wireless local area network, comprising:
a buffer configured to receive data for transmission to one or more lower power wireless devices;
processing circuitry configured to:
generate a wake-up radio packet including a wake-up data frame destined for the one or more lower power wireless devices;
configure the wake-up data frame with:
a type field indicative of a type of the wake-up data frame, wherein the type field also indicates a length of the wake-up data frame; and
a first identifier field indicative of information corresponding to the one or more lower power wireless devices; and
a transceiver configured to transmit the wake-up radio packet to the one or more lower power wireless devices to turn on wireless receivers at the one or more lower power wireless devices prior to initiating data transmission with the one or more lower power wireless devices; transmit a plurality of wake-up data frames sequentially, wherein the plurality of wake-up data frames are separated by short interframe spaces, and wherein each of the plurality of wake-up data frames is intended for one of the one or more lower power wireless devices; and transmit payload data in a group frame to the one or more lower power wireless devices subsequent to transmission of the plurality of wake-up data frames.

11. The network device of claim 10, wherein the processing circuitry is further configured to:
configure the wake-up data frame with a basic service set color field indicative of a basic service set color value, or a medium access control address field with a medium access control address corresponding to the wireless access point.

12. The network device of claim 10, wherein the information corresponding to the one or more lower power wireless devices includes a group identifier for a group of the one or more lower power wireless devices, and the processing circuitry is further configured to:
allocate an association identifier that is unused by any wireless device associated with the wireless access point as a group identifier for the group of one or more lower power wireless devices.

13. The network device of claim 10, wherein the processing circuitry is further configured to:
configure the wake-up data frame with a second identifier field,
wherein the first identifier field contains a first association identifier corresponding to a first lower power wireless device from the one or more lower power wireless devices, and the second identifier field contains a second association identifier corresponding to a second lower power wireless device from the one or more lower power wireless devices.

14. The network device of claim 10, wherein the first identifier field contains a first identifier value as a starting identifier, and the processing circuitry is further configured to:
configure the wake-up data frame with:
a bitmap length field indicative of a length of an identifier bitmap; and
a bitmap field containing the identifier bitmap, wherein a respective value of each bit in the identifier bitmap indicates whether a lower power wireless device corresponding to a respective identifier equivalent to the starting identifier plus an index of the respective bit belongs to a group of the one or more lower power wireless devices.

15. The network device of claim 10, wherein the first identifier field contains a first identifier value as a starting identifier, and the processing circuitry is further configured to:
configure the wake-up data frame with:
a plurality of identifier increment fields subsequent to the first identifier field,
wherein each of the plurality of identifier increment fields contains a respective increment value indicating that a lower power wireless device corresponding to a respective identifier equivalent to the starting identifier plus the respective increment value belongs to a group of the one or more lower power wireless devices.

16. The network device of claim 10, wherein the first identifier field contains a first identifier value as a starting identifier, and the processing circuitry is further configured to:
configure the wake-up data frame with:
a plurality of identifier increment fields subsequent to the first identifier field,
wherein each of the plurality of identifier increment fields contains a respective increment value, and
wherein a lower power wireless device corresponding to a respective identifier equivalent to an accumulative sum of the starting identifier and all increment values before and including the respective increment value belongs to a group of the one or more lower power wireless devices.

17. The network device of claim 10, wherein the processing circuitry is further configured to:
configure the wake-up data frame with:
a partial multicast medium access control address, or
a short hash value of the multicast medium access control address,
wherein the multicast medium access control address corresponds to a group of the one or more lower power wireless devices.

18. The network device of claim 17, wherein the processing circuitry is further configured to:
configure the wake-up data frame with:
the type field to indicate the wake-up frame is a group type; and
a cyclic redundancy check field subsequent to the type field indicative of a cyclic redundancy check value of the type field.

19. A method for receiving a wake-up radio signal to low power devices in a wireless local area network, the method comprising:
receiving, from a wireless access point, when a primary wireless transceiver of a lower power wireless device is inactive, at a secondary lower power wireless receiver of the lower power wireless device, a wake-up radio packet including a wake-up data frame, the received wake up data frame being one of a plurality of wake-up data frames transmitted sequentially and wherein the plurality of wake-up data frames are separated by short interframe spaces;
determining a type of the wake-up data frame from a type field in the wake-up data frame, wherein the type field also indicates a length of the wake-up data frame;
determining whether the wake-up radio packet and the wake-up data frame are intended for the lower power wireless device based on information corresponding to one or more intended lower power wireless devices from an identifier field in the wake-up data frame; and
in response to determining that the wake-up radio packet and the wake-up data frame are intended for the lower power wireless device, activating the primary wireless receiver for data transmission from the wireless access point of payload data in a group frame to the one or more intended lower power wireless devices subsequent to receiving the wake-up data frame.

\* \* \* \* \*